United States Patent [19]

Bossler et al.

[11] Patent Number: 4,884,008
[45] Date of Patent: Nov. 28, 1989

[54] AUTO-ADJUSTABLE OPERATING ROOM LIGHT

[75] Inventors: Hans J. Bossler, Münster/Altheim; Peter Enders, Frankfurt; Jörg Boxhammer, Griesheim; Bernd Rudolph, Alzenau; Bruno Sebralla, Bruchköbel, all of Fed. Rep. of Germany

[73] Assignee: W.C. Heraeus GmbH, Hanau, Fed. Rep. of Germany

[21] Appl. No.: 165,779

[22] Filed: Mar. 9, 1988

[30] Foreign Application Priority Data

Jul. 11, 1987 [DE] Fed. Rep. of Germany ....... 3723009

[51] Int. Cl.$^4$ .............................................. F21V 23/00
[52] U.S. Cl. ..................................... 315/152; 362/804
[58] Field of Search ................. 315/76, 149, 152, 155, 315/159, 315; 362/33, 287, 804

[56] References Cited

U.S. PATENT DOCUMENTS

| | | | |
|---|---|---|---|
| 4,025,777 | 5/1977 | Hayakawa | 362/250 |
| 4,517,632 | 5/1985 | Roos | 362/389 |
| 4,639,838 | 10/1987 | Kato et al. | 362/804 |

FOREIGN PATENT DOCUMENTS 3227494 2/1984 Fed. Rep. of Germany .
1537181 12/1978 United Kingdom .

Primary Examiner—David Mis
Attorney, Agent, or Firm—Frishauf, Holtz, Goodman & Woodward

[57] ABSTRACT

To provide for automatic adjustment of the light field of an operating room light in accordance with manual positioning of the light, an electrical servo control loop positions the respective lamps and/or deflection mirrors of circularly placed light sources (2) in the housing (1) to iluminate a given field in a given plane. The distance of the lamp from the given field is determined by an ultrasonic distance sensor (5; 5a, 5b, 5c) to provide one input to the servo loop, for comparison of the positioning of the light source to illuminate said field. If the distance of the illuminated field increases, the angular position of the light sources is automatically adjusted to provide the field at the increased distance. If the distance decreases, however, no adjustment is carried out unless an operator touches an operating handle. This is transformed into a manual readjustment signal which releases the servo system to then readjust the position of the light sources. A switch (33) is located in the control loop to interrupt the control loop and permit adjustment only upon an increase in distance. Thus, erroneous sensing of a smaller distance, for example given by the hands of a surgeon, surgical instrument, or the surgeon's head, will not affect repositioning of the lamp and the light sources therein.

14 Claims, 3 Drawing Sheets

AUTO-ADJUSTABLE OPERATING ROOM LIGHT

Reference to related patent, the disclosure of which is hereby incorporated by reference:

U.S. Pat. No. 4,025,777 (to which German Patent 25 19 426 corresponds).

Reference to related publications:

German Patent Disclosure Document DE-OS 32 27 494 British Pat. No. 1,537,181, to which French Patent Disclosure Document 23 39 129 corresponds.

The present invention relates to an operating room light, and more particularly to an operating room light which has adjustable lamp elements therein, so that the optical axes of the light emitted therefrom can be directed to an illuminated field in which an operation can be carried out.

BACKGROUND

Operating room lights are known in which a plurality of lamps are so arranged that the light beams will overlap in a specific region, so that an increased light intensity is obtained, which, due to the different spatial arrangement of the lamps, does not cast any shadows. Such operating room lights may have handles located thereon, centrally located in the lamp or at the edges thereof, in which the spacing of the lamp with respect to the operating field can be changed. Electric motors can be provided in the operating room lamp to adjust the positions of the lamps so that the light beams emitted therefrom will overlap in accordance with the wishes of the operating doctor.

U.S. Patent No. 4,025,777 describes an operating room lamp which is essentially ring-shaped, for fixed installation in an operating theater. The lower portion of the operating room element, which carries the light emitting surface, is subdivided to provide room for a plurality of light radiating lamps. The light radiators are located so as to be adjustable. Thus, a lamp guiding arrangement, coupled to the lamps, can change the light axes of the operating room lamp without moving the overall unit itself, so that the light beams from the respective lamp units coverage at a point which can be changed horizontally or vertically. The converging point can be previously determined. The individual lamp units are retained in a housing in a gimbal suspension and interconnected by guide rods and springs. The intersecting point of the three spatial axes can thus be shifted by appropriate readjustment of the control system which is formed by the respective guide rods. A carriage is provided which can be shifted along guide rails. The change or shift can be carried out by drive motors.

The overall operating room light is fixedly secured in the theater. This limits the possibility of the emission of light from the operating room fixture, so that, for example, it is not possible to select between horizontal and vertical light emission. Automatic refocussing, if the spacing of the light intersection during an operation should change, is not possible, however.

British Pat. No. 1,537,181 describes an operating room light which has a plurality of light sources to emit light beams therefrom, respectively, in order to provide for uniform illumination of an operating field. The light sources direct their light into two respective deflection mirrors, located in an arm of the light unit. This permits reflection of a light beam from an inner deflection mirror, in part, and further transmission of light, in part, to an external deflection mirror. The inclination of the mirrors with respect to a horizontal axis of the original light beams is adjustable. Thus, each arm of the unit provides two light beams on the field in question. The light beams can be converged. It is necessary to readjust the mirrors if it is required to refocus the position of intersection of the respective light beams in order to compensate for possible changes in spacing between the operating room light and the field to be illuminated.

German Patent Disclosure Document DE-OS 32 27 494 describes an operating room light specifically adapted for dental work and jaw surgery. A light beam remains continuously directed to the oral region of the patient by automatic tracking of a lamp if the patient's chair is moved. The necessary tracking arrangement includes an ultrasonic transmitter located in the region of the head of the patient, and an ultrasound receiver located in the treatment room, as well as a tracking or targeting circuit. Servo motors or stepping motors are provided to ensure tracking, by bringing the lamp holder in predetermined positions, or inclinations, respectively. Such an operating room light cannot be used for general surgery since the ultrasound transmitter must be located in the immediate vicinity of the operating field to be illuminated, that is, in the region of an open wound. For general surgical purposes, such a system cannot be used since an ultrasound transmitter cannot be placed in an open wound. Errors in adjustment as well as difficulties in handling and sterilization impede such application.

THE INVENTION

It is an object to provide an operating room light of essentially standard construction, in which the light beams can be automatically adjusted to compensate for movement or change in distance between the operating room light and the operation field, so that any illumination pattern or zone originally set will be retained in its base position. The system must be reliable, and interference, for example by introducing a hand, or an observing head of the operating doctor or an assistant, should not interfere with the adjustment of the lamp.

Briefly, an ultrasonic distance sensor is located on the housing, and facing the operating surface, generating an electrical actual distance signal representative of the actual distance between the housing and the surface. The distance signal is coupled to a servo control circuit which controls a lamp adjustment element arrangement, for example constructed as known, to control an adjustment element which directs light in accordance with the actual distance signal, but only when a manual adjustment signal is present. A manual operation sensing element is coupled to the normally present handles which adjust the light emission from the operating room lamp to generate the manual adjustment signal.

In accordance with a feature of the invention, the light beams are emitted from the operating room lamp in a group of beams located in ring shape about the circumference of a circular unit. These beams can be generated either by individual lamps whose optical axes are defined by reflectors, or by lamps which direct light to deflection mirrors, and which are irradiated from the interior of the operating room light by one or more individual light sources. In both instances, the reflectors or deflection mirrors, respectively, are adjustably located so that their position can be changed. Adjustment of the position is effected by an electric motor, and preferably by a stepping motor. The adjustment signal is the difference between a distance signal generated by the ultrasonic distance sensor and an angle, derived, for example, from a Hall generator, and which is proportional to the optical axes of the respective light beams.

The operating room light in accordance with the present invention has the specific advantage that it can be universally used, because the direction of the beam emission is independent of the adjustment; thus, the operating room light can be used for essentially vertical emission of light as well as for horizontal light emission, and the automatic adjustment will be operating even if the distance of the lamp from the operating field changes. Thus, optimal depth illumination of wounds for operation, or body cavities, can be obtained. Any illuminated field will remain equally illuminated although the field itself is illuminated by a plurality of light beams from various sources, and will retain the illumination even if they are changes in spacing to the operating room light.

DRAWINGS, ILLUSTRATING AN EXAMPLE

FIG. 1b is a schematic sectional view through line A-B of FIG. 1a;

DETAILED DESCRIPTION

Figure 1A:
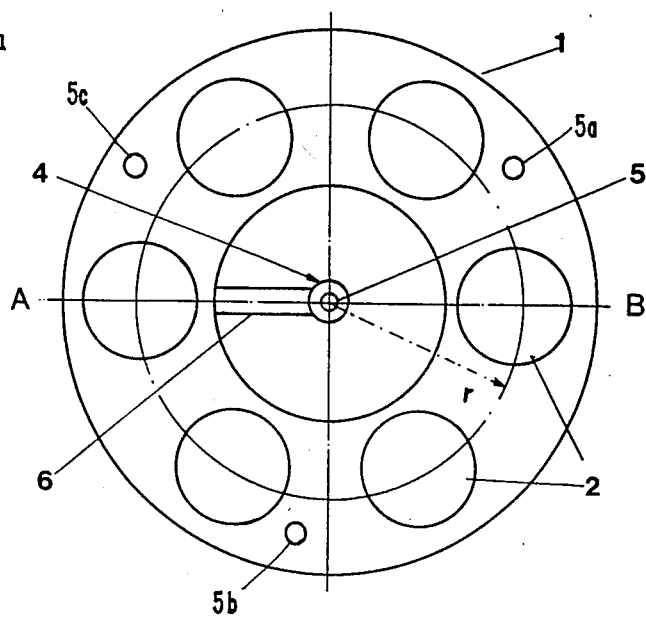
FIG. 1a is a highly schematic bottom view of an operating room light, and illustrating the light emission surface of such a light, in which light sources are located in ring shape.
Figure 1B:
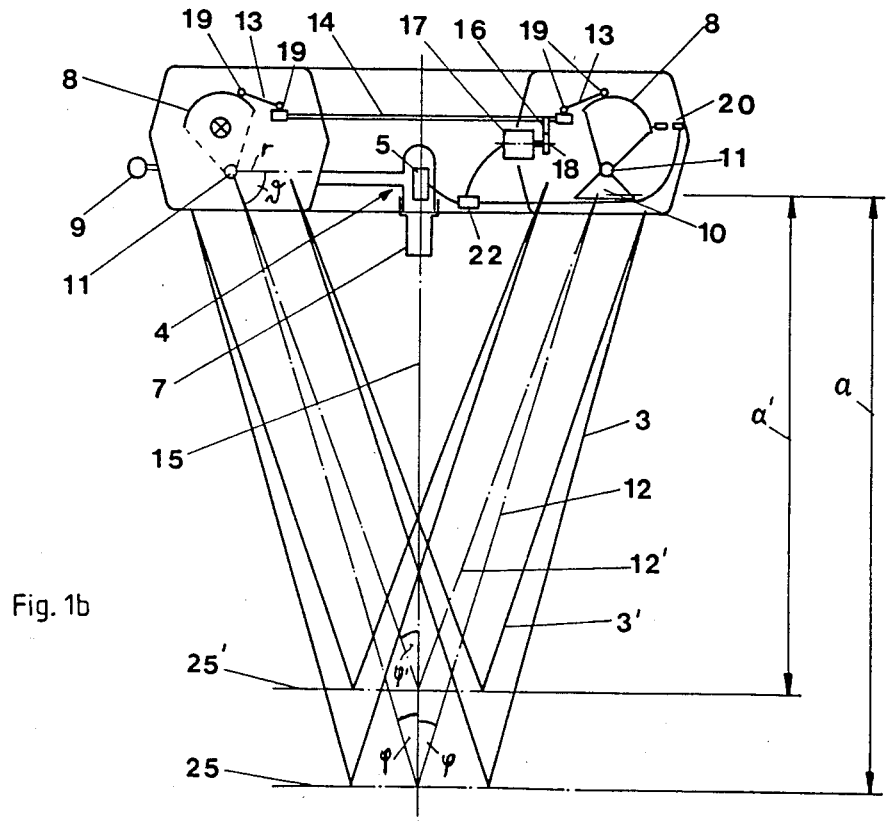

Referring first to FIGS. 1a and 1b (collectively: FIG. 1):

A ring-shaped housing 1 has light emission surfaces 2 through which light beams 3 (FIG. 1b) are emitted. A tubular handle 4 is located in the center of the operating room light. The tubular handle 4 retains an ultrasonic or ultrasound distance measuring element 5. The handle 4 is mechanically coupled to the housing 1 by an arm 6.

A tubular handle element 7 is secured about the handle 4. Handle 7 can be removed for sterilization. When slipped on the handle 4, it is locked thereon, and by engagement of the handle element 7 with the handle 5, a servo or follower system coupled to the ultrasonic distance measuring element 5 is electrically activated. Handle element 7 as well as handles 9 located at the circumference of the housing 1 are coupled to an electrical circuit which generates a "release" signal on a control loop of the servo system. The light emission opening surfaces 2 are preferably covered by Fresnel lenses. Interiorly of the housing, reflector lamps 8 are located which, preferably, utilize infrared (IR) light transparent reflectors. The beam exit angle can be adjusted by tipping the lamps 8 about a predetermined tilt axis 11, defined by a holder structure 10. The tilt axes 11 of the respective lamps are tangential to a circle of average diameter r, as seen in FIG. 1a. By changing the position of the lamps 8 about the axes 11, the direction of a previous optical axis 12 with an angle of incidence δ, that is, the angle between the axis 12 and the circle with the diameter r, is discontinued, and, rather, a new angle δ′, with respect to the optical axis 12′, will be accepted. The appropriate light beam is shown at 3′. Specific identification of the angle δ′ has been omitted from the figure for clarity.

All the lamps 8 are coupled by a link 13 which has joints 19 at its end, joints 19, in turn being coupled to a circumferential ring 14 to obtain uniform shifting of the tilt axes 11. Thus, all lamps with their optical axes 12, or 12′, respectively, will emit beams with the same angle φ or φ′, respectively, with respect to the axis 15 of the operating room light 1. The angles φ and δ are related by the relationship:

$$\phi = 90° - \delta \quad (1)$$

The ring 14 can be rotated about the axis 15 of the lamp and, to provide for such rotation, a portion thereof has a rack 16 formed thereon, engageable by a pinion 18 of a positioning motor 17. Driving motor 17 rotates ring 14 about the axis 15, so that the links 13, coupled with their ends in gimbal couplings, move the housing of the lamps 8 about the axes 11. An electric angle sensor 20, coupled to the lamps and to the housing of the lamp 1, respectively, determines the actual angle δ. Preferably, the angle sensor includes a Hall generator, although other types of angle sensors may be used, such as an optical scanning system, a mechanical coupling element coupled to a potentiometer, voltage divider or the like, or other equivalent structures. The important feature, however, is to provide an electrical signal—if necessary, amplified—derived from the angle sensor, and which provides a control parameter of value x. This value can be compared with an actual value signal or parameter w, derived from the ultrasound sensor, for comparison in a difference amplifier or in a comparator. Preferably, the signal derived from the angle sensor 20 should be directly comparable with the signal from the distance sensor 5, so that motor 17 need receive only then a positioning signal y if there is a difference between the control parameter x and the adjusted or guide level or parameter w.

The ultrasound distance sensor 5, motor 17, and angle sensor 20 are coupled to a circuit, to be described in detail with reference to FIG. 2. The parameter w is directly proportional to the spacing a or a′, respectively, between the ultrasonic sensor 5 and the illumination surface 25 or 15′, respectively. The angle between the axis 15 in the illumination surface 25 may change between 0° to 90°. Mathematically: δ=arctan (a/r). For stationary conditions, x=w. The control parameter x is defined as $$x = p \cdot a = p \cdot r \cdot \tan \delta \quad (2)$$

wherein p is a proportionality factor.

In accordance with a feature of the invention, handle element 7 is made of electrically conductive material and upon engagement with the handle 4, the servo system is activated.

OPERATION

Let it be assumed that the electrically conductive handle element 7 is appropriately engaged with the handle 4. This permits activation of the servo system when the handle element 7 is touched by the operating doctor. It permits changing the distance between the operating room light and the operating field in the direction of decreasing the distance. If the distance is increased, an automatic readjustment will always occur, even without the operator's hand touching the handle 7.

This eliminates disturbances and erroneous measurements if, for example, the head or the hands of the operator enter the operating field. This is best seen with reference to FIG. 1a. Let it be assumed that, during the adjustment, a hand of the surgeon is in the plane 25', which is measured by the ultrasound sensor 5. After the operator removes his hand, the ultrasound sensor 5 measures the real distance to the operating field in the plane 25—which is below the plane 25', and correspondingly adjusts the optical axes 12 to converge on the plane 25. The distance a is then electronically memorized or locked. After correction, a decrease of the spacing between the operating room light and the illuminated plane at the surface 25' will no longer be considered as a control signal, since plane 25' is above the plane 25, which would result in a decrease in the spacing, compare distances a and a'.

For some installations, it is desirable to have a plurality of ultrasonic distance sensing elements. If so, they are preferably located eccentrically with respect to the axis 15 of the operating room lamp. The space between the light emission openings 2 (FIG. 1a) can be used to place ultrasonic distance measuring elements.

The surgeon may wish a change in the illuminated field, by expanding the size thereof. This can easily be obtained by changing the intersecting point of the optical axes of the lamps by placing them below the illuminated plane. This can be obtained, for example, by increasing the parameter w derived from the ultrasonic distance measuring element 5, or by introducing an offset voltage to a differential amplifier or comparator. The adjustment, as well as the adjustment of the light intensity, can easily be obtained by suitable control switches or control element located on the housing of the lamp 1, as well known, or by adjustment elements located on a separate command panel, independently of the lamp housing 1.

Figures 2A, 2B:
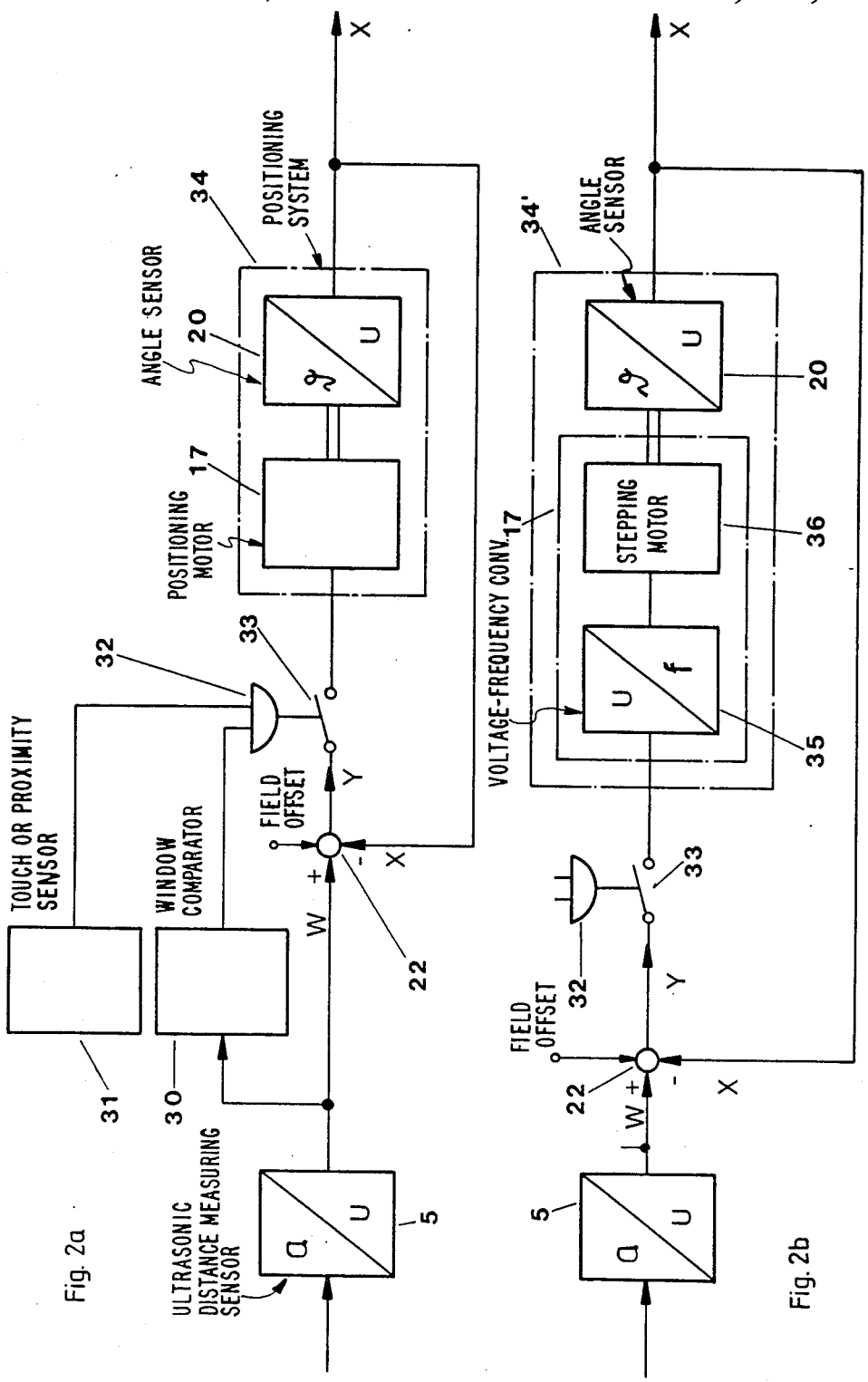
FIG. 2a is a block circuit diagram of a servo follower system.
FIG. 2b is a block circuit diagram of a modified servo follower system.

The electrical servo system is shown in FIG. 2 (collectively). Referring first to FIG. 2a: The ultrasonic distance measuring sensor 5 provides an output voltage u, depending on the distance a. The output signal w, representative of the voltage u, is connected to a window comparator 30 which tests if the level of the signal w is within a range of voltages between $w_1$ and $w_2$. This range may also be referred to as a gate condition. The output of the window comparator 30 is applied to a logic circuit 32 which, in its simplest form, is an OR-gate. The second input to the logic circuit 32 is coupled to a sensor 31 which senses if the handle element 7, or another handle element at the circumference of the lamp, has been touched. This element 31, thus, can be merely a touch sensor or a proximity sensor. The output of the logic circuit 32 controls the position of a controlled switch 33 which is connected to permit interruption of current to a positioning motor 17. This ensures that adjustment can be obtained only within a predetermined adjustment range of $a_1 < a < a_2$. A suitable range is, for example, between 50 to 180 cm spacing between the operating room light 1 and the illuminated field 25 or 25'. Circuit 30 can also determine if a change in w value is in the direction of increasing distance a.

If a decrease in distance is commanded, readjustment of the lamp, that is, operation of the positioning motor 17, will occur if and only if the handle element 7, or an equivalent element 7 has been gripped or touched, so that the sensor 31 has received a signal and responded. This prevents erroneous adjustment within the predetermined spacing, as well as interferences due to portions of the body of the surgeon which may be sensed by the ultrasonic beam of the ultrasonic distance measuring element 5; or of operating tools of the surgeon.

The command value w is applied additionally to a comparator 22. Comparator 22 may, of course, be constructed in form of a differential amplifier. The comparator 22 compares the command input w with an actual control signal x which corresponds to the angular position of the lamp. The angular position of the lamp is determined by the angle sensor 20. The signal derived from the angle sensor 20, if necessary suitably amplified, is then transformed to the control signal x suitable for comparison with the signal w in the comparator 22. The parameters w and x are of similar dimension and, thus, the system is a single servo system. Upon a difference between the signals w and x, difference amplifier 22 provides a positioning signal y. Positioning signal y is applied through switch 33 to the positioning motor 17, which, if the switch 33 is closed, controls the positioning motor 17 to tilt the lamps about the tilt axis until the signal derived from the angle sensor 2 is such that the actual angle signal x and the command signal w are zero or null.

An optimum adjustment of the width of the illuminated field can be obtained by introducing an offset voltage in the comparator 22. This is particularly simple if the comparator 22 is a differential amplifier. The maximum field diameter of a typical operating lamp is in the range between about 33 to 38 cm. Looked at from the point of view of an automatic control system, positioning motor 17 and angle sensor 20 form the overall actual positioning element 34. Under stationary conditions, $x = w$, in which x and w are directly proportional to the spacing a.

The system shown in FIG. 2a is a closed loop system. Of course, comparison between the command signal w and the actual signal x can be carried out differently, for example to the input of a controller which then generates the positioning signal y. Adjustment criteria, customary in servo and control technology may be used, for example use of proportional, integral and/or differential components or amplifiers, in order to obtain stability of the system without hunting or overruns.

The system shown in FIG. 2b has been found particularly suitable in actual practice. The positioning signal y is applied through switch 33 to a voltage—frequency converter 35 which is coupled to a stepping motor 36. The converter 35 and stepping motor 36 then, together, form the drive element generally shown as the positioning motor 17 in FIG. 2a to control the position of the individual lamps 8. The angle sensor 20, preferably, is a Hall generator. Ultrasonic distance sensor 5, logic circuit 32, and the elements connected thereto are identical to those of FIG. 2a, and have been given the same reference numerals.

The positioning motor has the characteristic of an integrating positioning element and, in dependence on change in spacing, the angular adjustment of the optical axes is carried out until the difference between command and actual signal value becomes null or zero. The operating speed of the positioning motor 17, and also of the stepping motor 36, preferably is low so that, in actual practice, errors in positioning and adjustment speed due to inertia, and inertia forces in the control loop, can be neglected.

Figure 3:
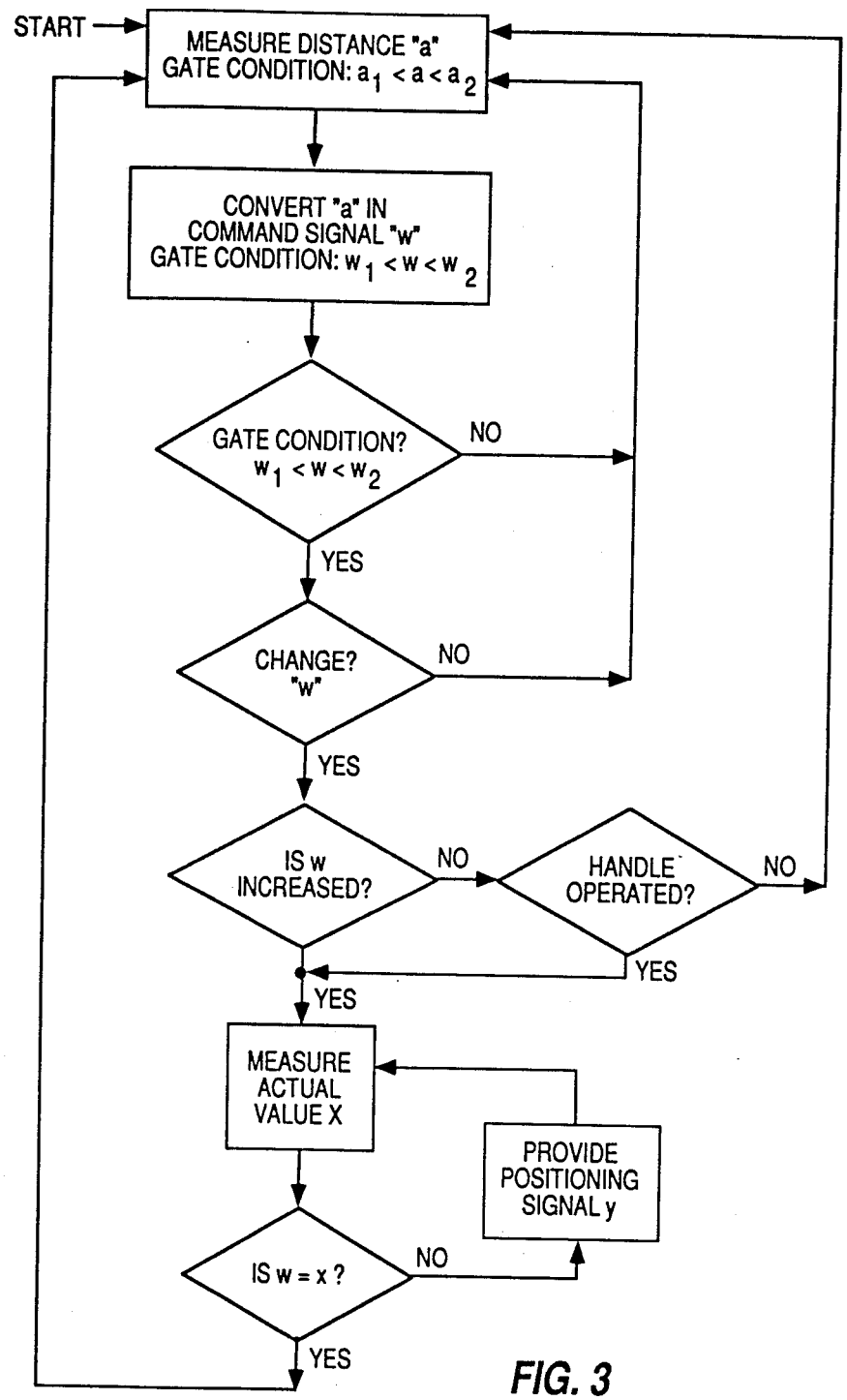
FIG. 3 is a flow diagram illustrating the sequence of automatic readjustment of the lamps.

The operation of the overall system is best explained with reference to FIG. 3:

In the position "start", the operating room light is first energized and the ultrasonic distance sensor measures the spacing or distance a which must be between a predetermined distance range, that is, between $a_1$ and $a_2$, so that the gate condition $a_1 < a < a_2$ is satisfied. The sensed spacing a is converted into a signal forming the command signal w and, after conversion into the signal, a test is carried out if the gate conditions $w_1 < w < w_2$ are satisfied, in which the signal values $w_1$ and $w_2$ correspond to the distances $a_1$ and $a_2$. If the gate condition $w_1 < w < w_2$ is satisfied, a test is carried out if the command value w has changed. If a change is sensed, it is determined if the change of w is an increase of not.

If the relationship $w_1 < w < w_2$ is not met, or if there has been no change in the command level w, the "no" return lines from the respective tests, connected back to the start, do not command any further activity. If the spacing w has been decreased, a further test is carried out, namely if an electrical signal is derived from the touch or proximity sensor 31, that is, if the handle element 7 or a similar handle element is touched, indicating that a manual adjustment of the lamp is being carried out. If no touch is sensed, the test again returns the control loop to the original or start or measure point in the measuring cycle. The distance measurement between lamp 1 and operating plane 25 is continued. Thus, momentary decreases in the measured distance as sensed by the ultrasonic sensor 5 between the operating field and the lamp do not affect the adjustment, and interference in the ultrasonic beam by the hands, head, operating tools and the like, will not result in erroneous readjustment of the illuminated field.

The handle may have been operated by the operator, however, and if an increase in the spacing to the operating field has been sensed results in an increase of the command level w. The position of the lamps corresponding to the actual level x is determined by the angle sensor and a suitable signal derived, amplified if necessary, and compared with the command value w. Thereafter, a test is carried out if command level and actual level of the signals are identical. If the test is negative, a positioning signal y is provided to the positioning element for the lamps, the actual distance a is measured and converted into the actual value x and the comparison between command value and actual value is carried out until the relationship w=x is met. No further changes or activities are carried out by the control loop if the "yes" condition is met; only continued measurement of the spacing a will result.

Various changes and modifications may be made within the scope of the invention concept, and any one of the features may be used with any of the others. For example, a plurality of sensors can be located in or on the lamp housing 1, schematically shown by sensors 5a, 5b, 5c, positioned eccentrically with respect to the housing. These sensors may be placed in addition to the central sensor 5, or the central sensor 5 may be omitted. By standard triangulation, the distance from the plane of the sensors in the lamp 1 to the illuminated field plane 25 or 25' can be readily determined. The respective ultrasonic sensor or sensors preferably operate in the ultrasonic range of from between 100 to 400 kHz, and especially at about 220 kHz.

We claim:

1. Operating room light having
   a housing (1);
   manually operable means (4, 6) on the housing for adjusting the position of the housing with respect to a reference;
   light generating and directing means (2) generating light and directing the light, separately, from at least two spatially separate regions of the housing in form of at least two light beams on a surface (25) to be illuminated;
   adjustment means (14, 16–19, 36) coupled to the light generating and directing means to direct the light to said surface such that the at least two beams provide a predetermined illuminated field on said surface,
   and comprising, in accordance with the invention,
   an ultrasonic distance sensor (5) located on the housing facing said surface (25) and generating an electrical distance signal (w) representative of the actual distance between said housing and said surface;
   manual operation sensing means (7) coupled to said manually operable means (4, 9) on the housing, and generating a manual handling signal;
   and a positioning system (34, 34') including a servo control circuit (22, 34, 34') coupled to receive said distance signal (w) and said manual adjustment signal, and controlling said adjustable means (14, 16–19, 36) for controlling said light generating and directing means in accordance with said actual distance signal when said manual adjustment signal is present.

2. The light of claim 1, wherein said light is essentially circular, and said ultrasonic distance sensor (5) comprises an ultrasonic transmitter—receiver located essentially in the center of said light.

3. The light of claim 1, wherein said light is essentially circular; and said ultrasonic distance sensor comprises a plurality of sensor elements (5a, 5b, 5c) located eccentrically with respect to the central axis (15) of said light.

4. The light of claim 1, wherein said servo control circuit includes a switch (33) and a logic circuit (32) logically determining if said manual adjustment signal is present and controlling said switch (33) to close said servo control circuit in a closed servo loop when said manual adjustment signal is present.

5. The light of claim 1, wherein said light is essentially circular;
   said manually operable means comprises a handle (4) located essentially in the center of said circular light;
   and wherein said ultrasonic distance sensor (5) comprises an ultrasonic distance sensing transmitter—receiver located within said handle (4).

6. The light of claim 5, wherein the ultrasonic distance sensor (5) radiates an ultrasonic signal in a frequency range of between 100 to 400 kHz.

7. The light of claim 1, wherein said ultrasonic distance sensor radiates an ultrasonic frequency in the range of about 220 kHz.

8. The light of claim 1, wherein said adjustment means includes an angle sensor (20) coupled to the light generating and directing means and sensing an angle of inclination thereof with respect to the housing (1) of said light, and generating a signal representative of the direction of light beams being projected by said light generating and directing means (2) to form an actual light directing signal, coupled into said servo control circuit.

9. The light of claim 8, wherein said angle sensor (20) comprises a Hall generator.

10. The light of claim 1, wherein said adjustment means comprises an electric servo motor.

11. The light of claim 1, wherein said adjustment means comprises a stepping motor.

12. The light of claim 1, wherein said servo control circuit comprises a closed servo loop having two inputs;

a gate or window comparator circuit (30) coupled to receive the electrical actual distance signal derived from said ultrasonic distance sensor (5) and passing only signals fitting within a gating or window range, and providing a first servo input signal forming a command signal (w);

the second input of said servo circuit being coupled to said manual operation sensing means (7, 31) and providing the manual adjustment signal, said servo control loop adjusting the position of the adjustment means, and hence of said light generating and directing means (2) when said control loop is closed upon sensing presence of the manual adjustment signal;

said servo control loop including a comparator (22) comparing the command signal (w) with a signal (x) representative of the actual position of said light generating and directing means and representative of directing respective beams of light on said surface at a predetermined angle of incidence and, upon deviation of said command signal and said actual angle signal, providing a positioning signal (y) for the adjustment means (14, 16–19, 36) for repositioning of the light generating and directing means.

13. The light of claim 12, further including a logic circuit (32) and a controlled switch (33) included in said control loop, said logic circuit determining the presence of said manual adjustment signal and controlling said switch (33) to close the control loop when said manual adjustment signal is present.

14. The light of claim 1, further including a logic circuit (32) and a controlled switch (33) included in said control loop, said logic circuit determining the presence of said manual adjustment signal and controlling said switch (33) to close the control loop when (i) the distance (a) between the sensor (5) and the illuminated field increases; or (ii) said manual adjustment signal is present regardless of the direction of change of said distance (a).

* * * * *